INVENTOR
PHILIP W. TRUBEY

United States Patent Office 2,962,350
Patented Nov. 29, 1960

2,962,350

PRODUCTION OF PRECIPITATED CALCIUM CARBONATE

Philip W. Trubey, Wakefield, Quebec, Canada, ass'gnor to Aluminium Laboratories Limited, Montreal, Quebec, Canada, a corporation of Canada Filed Dec. 3, 1957, Ser. No. 700,491

3 Claims. (Cl. 23—66)

This invention relates to the production of precipitated calcium carbonate, generally referred to in the trade as whiting and more particularly to the production of whitings of high quality used for instance in the manufacture of paper, rubber, paint and baking powder.

The production of high grade whiting of controlled physical characteristics and chemical composition has been the subject of considerable study for many years. Although there are many reactions by which $CaCO_3$ may be produced, the production of this chemical in a desired fine particle size, relatively free from objectionable minor impurities, and on a commercial scale has been restricted to a relatively limited number of reactions governed principally by the types of raw material available. For example, consideration has been given to the causticization of lime slurry with soda ash to give whiting and caustic soda. It has also been proposed to produce whiting directly by the carbonation of hydrated lime. Another reaction which has been used with some success is that of calcium chloride with sodium carbonate to give whiting and sodium chloride (see "Precipitated Calcium Carbonate. Limestone becomes a Fine Chemical," Robert L. Taylor, Chem. Ind., vol. 60, No. 6).

I have now found that certain distinct and hitherto unrealized advantages are obtainable in employing the reatcion between magnesium bicarbonate and calcium chloride to produce high grade whitings, in that this reaction may be used not only to produce high grade whitings in some respects superior to those produced by other processes but also in that the reaction lends itself readily to integration in chemical circuits adapted for continuous production and employing as feed raw materials from which, so far as I am aware, high grade whiting has not hitherto been produced.

Accordingly, it is a principal object of the present invention to provide for the production on a commercial scale of high grade whiting by a process which comprises reacting calcium chloride with magnesium bicarbonate.

It is another object of the invention to provide a circuit which is adapted for continuous production which employs as feed impure sources of lime, magnesium oxide and carbon dioxide, and which produces a high grade precipitated calcium carbonate, a lower grade calcium carbonate residue and magnesium hydroxide. The high purity which is brought about under these conditions is due to making the whiting in a separate vessel out of contact with the original raw materials with which all major impurities remain.

It is a further object of the invention to provide a circuit for the production of high quality whiting which may be based upon the treatment of raw materials containing calcium and magnesium in substantial proportions, such for instance as brucite, dolomite and the like.

It is another object of the invention to extract the magnesia values of the various raw materials as magnesium hydroxide. This results in a magnesia with properties very similar to those of magnesia produced by the sea-water process, but without the geographical limitations imposed on sea water plants. Furthermore the calcium values are discarded in the sea-water process, whereas by the present process they are recovered; again, the present process operates at higher solution concentrations than the sea-water process thus presenting considerable economic advantages in plant equipment and processing.

Other objects and adavntages of the invention will be apparent as the specification proceeds.

According to the invention, magnesium bicarbonate is reacted in aqueous solution with a solution of calcium chloride under controlled conditions to produce a calcium carbonate precipitate. Preferably, the calcium chloride is present in about 10% excess, and the reaction may be conducted in the presence of substantial concentrations of magnesium chloride.

A preferred chemical circuit according to the invention comprises a "carbonator-chloride" stage in which impure magnesium oxide containing material is slurried in a solution of magnesium chloride to which carbon dioxide is introduced with agitation, and which produces a solution of magnesium bicarbonate and magnesium chloride and impure whiting as a residue; a "whiting precipitator" stage to which is fed the magnesium bicarbonate and magnesium chloride from the carbonator-chlorider stage and an excess of calcium chloride solution and which produces a precipitated calcium carbonate and a magnesium chloride solution one-half of which is recycled as feed to the carbonator-chlorider stage; and a "magnesium hydroxide precipitator" stage which receives as feed the other half of the magnesium chloride solution produced in the "whiting precipitator" stage and impure lime, and which produces magnesium hydroxide as a precipitate and a solution of calcium chloride which forms the feed for the "whiting precipitator stage."

The invention and its operation and use will be explained in greater detail with reference to the accompanying drawings wherein.

Figure 1:
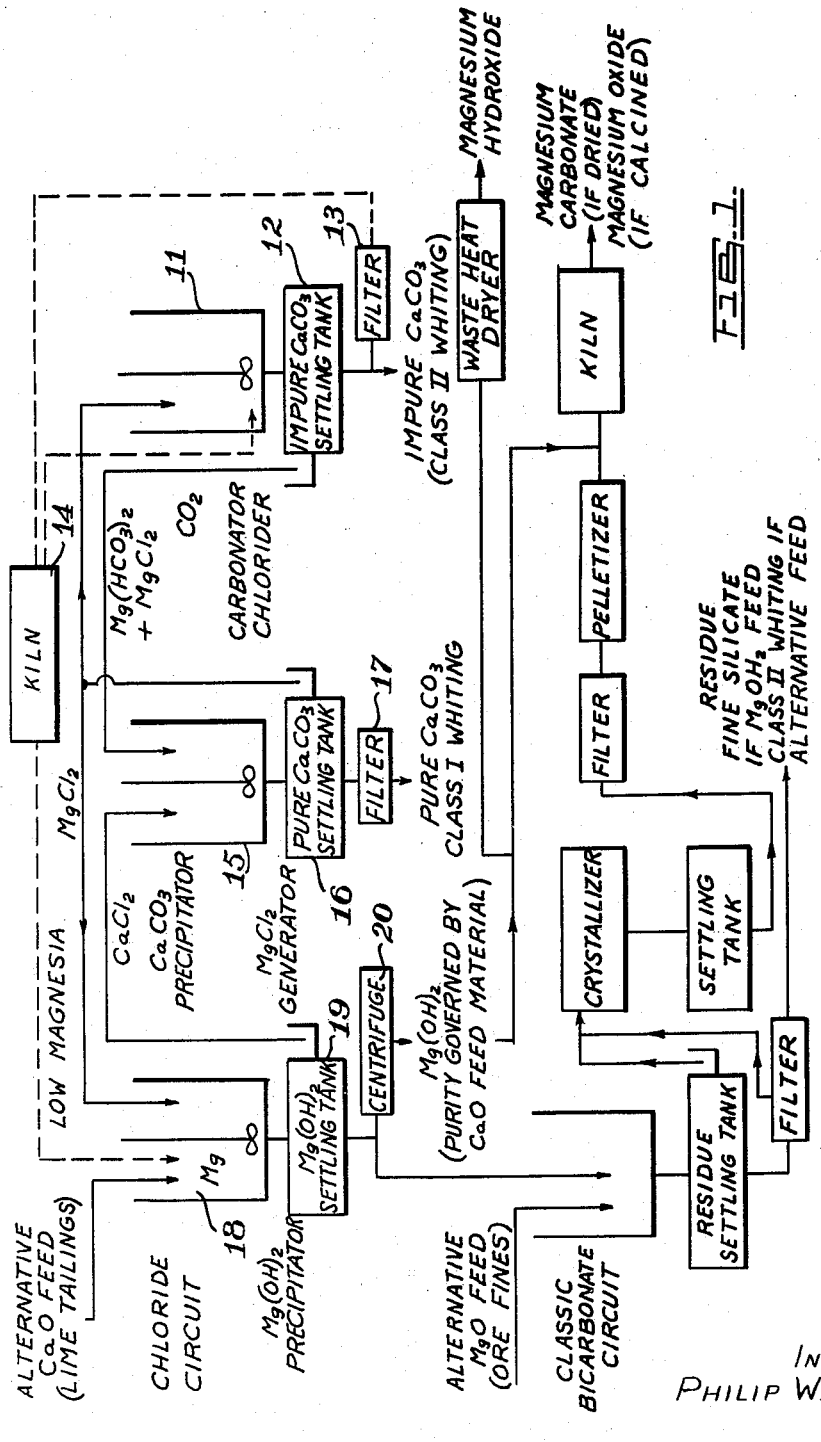
Figure 1 illustrates a suitable flow sheet for a circuit according to the invention and which indicates the manner in which such a circuit may be integrated with a classic bicarbonate circuit to extend the variety of products which may be produced.

The circuit illustrated in the drawing will be described on the assumption that the principal source of raw materials for the circuit is brucite although other magnesia bearing materials such as dolomite may be used. In the circuit illustrated, ore or other brucite-containing material is fed into the "carbonator-chlorider" 11 where it is slurried with recycled magnesium chloride solution. Carbon dioxide in the form of kiln stack gas or flue gas is introduced and a standard carbonation is carried out under agitation. The resulting liquor now contains all the original magnesium chloride plus a chemically equivalent quantity of magnesium bicarbonate. The solids consisting of impure carbonate are allowed to settle in settling tank 12 and are filtered off by means of filter 13. This material is a calcium carbonate of purity dependent on purity of feed to the carbonator and may be employed as whiting or may suitably be passed to a kiln 14 for calcination to quicklime.

The clear liquor is passed from settling tank 12 to the whiting precipitator 15.

In the "whiting precipitator" 15 recycled calcium chloride solution is mixed with the liquor from the carbonator-chlorider and reacts to form a clear precipitated calcium carbonate and more magnesium chloride. After being allowed to settle in settling tank 16 the calcium carbonate is filtered off in filter 17 and the clear liquor from the settling tank 16 which now contains two chemical equivalents of magnesium chloride is split into two streams, one of which is directed back to the "carbonator-chlorider" 11 and the other of which is directed to the magnesium hydroxide precipitator 18.

In the magnesium hydroxide precipitator 18, the magnesium chloride solution is reacted with a thick slurry of hydrated lime (or other lime containing material depending upon the required purity of the magnesium hydroxide). The magnesium hydroxide precipitate is removed by suitable means represented herein by the settling tank 19 and the centrifuge 20 and the clear liquor which is a solution of calcium chloride is returned to the whiting precipitator 15.

Figure 2:
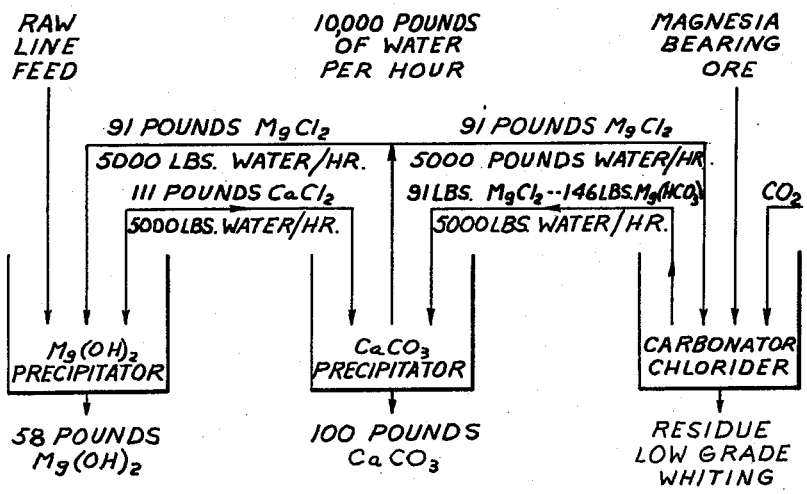
Figure 2 illustrates diagrammatically a circuit balance arranged to produce one pound mole of magnesium hydroxide per hour at a solution concentration of 8.0 grams per litre magnesium oxide equivalent.

The circuit balance is illustrated in Figure 2 which shows diagrammatically the quantities involved for a circuit producing one pound mole per hour of magnesium hydroxide at a solution concentration of 8.0 grams per litre of MgO equivalent. The relative proportions of solid products and solution concentrations will remain the same at any scale of operation. If any solution is present in excess, the system will tend to restore its balance by conversion of calcium chloride to calcium carbonate in the "carbonator-chlorider," thus enriching the calcium carbonate residue. If $CaCl_2$ is in excess this correction will be automatic. If $MgCl_2$ is in excess it can be converted to $CaCl_2$ by proportionately increasing the lime additions in the $Mg(OH)_2$ precipitator.

To illustrate how the process of the invention may be integrated with other related processes employing the circuit illustrated in Figure 1, the return of the calcium carbonate residue to kiln 14 rather than merely drying it to produce a whiting is illustrated in dotted lines as an alternative. The purpose of this extension would be to improve the $CO_2$ economy and increase MgO recovery from feed. Ordinarily the circuit would be dependent on $CO_2$ supplied from outside or from the burning of dolomite if this is used as raw material, plus what might be recovered from the expulsion of free carbonic acid after whiting precipitation, if this is found necessary. However, if the residue from the original carbonation is calcined, all the $CO_2$ contained in the original brucite or other raw material is released for recycle to the process. The solid product of the calcining kiln, low magnesia quicklime, could be sold where high magnesia lime is unacceptable, or serve as an alternative precipitant in the magnesium hydroxide precipitator. In this way the recoverable MgO values of the brucite not taken out in carbonation would be recovered to the product.

The carbonate-chloride circuit can be dovetailed neatly with a classical bicarbonate circuit. Here the principle consists in a second, conventional, carbonation carried out on the magnesium hydroxide product of the chloride process. This enables tailings or other materials containing lime together with high silica and mixed oxides impurity to be used as a precipitant for magnesium hydroxide. The silica and other impurities would be left behind after the second carbonation. This feature would allow both the MgO and the CaO in tailings of a plant which is primarily producing MgO from brucite, otherwise wasted, to be recovered. The MgO values are converted into magnesium hydroxide, which makes an excellent feed for a bicarbonate circuit, and is there purified, while the CaO values are converted to a premium grade precipitated calcium carbonate.

Magnesium oxide from the bicarbonate process is not suitable for producing active oxide which is at the same time dense. This is because in order to raise the density of the light oxide normally produced by this process it is generally necessary to calcine at higher temperatures thereby reducing the chemical activity. Therefore oxide from carbonate form is usually only lightly calcined and sold as light but active oxide. However, magnesium hydroxide, as precipitated, is much denser to start with and can therefore be calcined (e.g. in kiln 21) to produce an active yet relatively dense oxide.

Thus by integrating the two processes the product can be taken out, in any proportion, as light oxide, dense oxide, magnesium carbonate (basic or normal) or magnesium hydroxide, while a range of whitings and quicklimes are available from the calcium phase of the complex.

The carbonation carried out in the "carbonator-chlorider" is effected in one of the usual ways well known to the industry. The presence of magnesium chloride in the recycled solution returned to the carbonator increases rather than decreases the solubility of magnesium bicarbonate. However, it is convenient to break off carbonation when a quantity of magnesium oxide chemically equivalent to the magnesium chloride has been dissolved. In this manner the circuit is more easily kept in balance. A suitable dissolved concentration of magnesium oxide, and one common to the magnesia industry, lies in the range 8–10 grams per litre although higher concentrations are possible if the partial pressure of the carbon dioxide in the carbonator-chlorider is increased. Figure 2 shows the relative quantities of the different products which will be obtained and the concentrations of solutions at different points in the circuit if a dissolved concentration of magnesium oxide of 8.0 grams per litre is adopted as a basis of operations. Under average carbonating conditions, and with a finely divided feed, this concentration can be reached in about half an hour at room temperature.

The reaction between magnesium bicarbonate solution and recycled calcium chloride solution can be taken to better than 90% completion in a period of about one hour within a temperature range of 140–180° F. Particle size distribution within the range common to whitings i.e. 0.1 to 30 microns, as well as other physical properties, can be controlled by varying the precipitation conditions such as temperature, reaction time, degree of agitation, manner of bringing together the reactants etc. and in other ways known to the precipitated chalk industry and to persons skilled in the art. The product can be easily filtered and washed free from soluble impurities to any degree required. The whiting is remarkably free from insoluble impurities since the reacting solutions have been generated in other parts of the circuit where all insolubles and suspended solids have been left behind.

The magnesium chloride solution going from the whiting precipitator to the magnesium hydroxide precipitator can be subjected to a conventional softening operation with lime to remove residual bicarbonates which would otherwise appear in the magnesium hydroxide as calcium carbonate impurity.

The precipitation of magnesium hydroxide from magnesium chloride solution with lime or lime bearing material is carried out in one of the conventional ways known to the industry.

What I claim as my invention is:

1. A process for the production of high purity precipitated calcium carbonate from raw material containing calcium and magnesium in substantial proportions comprising the first step of slurrying said raw material in a magnesium chloride brine to which carbon dioxide is introduced with agitation to precipitate impure calcium carbonate and produce a clear solution of magnesium bicarbonate and magnesium chloride, the second step of adding a clear solution of calcium chloride to said clear solution of magnesium bicarbonate and magnesium chloride to produce said high purity precipitated calcium carbonate and said magnesium chloride brine, then dividing said brine into two streams, one stream being returned to the first step and the other stream being fed to an aqueous slurry of lime containing material to precipitate magnesium hydroxide and produce said clear solution of calcium chloride for return to said second step.

2. A process as defined in claim 1 wherein the raw MgO containing material comprises brucite as the principal source of MgO.

3. A process as defined in claim 1 wherein the raw CaO containing material is produced by separating, drying and calcining $CaCO_3$ which remains after the production of the $Mg(HCO_3)_2$ solution in said first separate stage.

References Cited in the file of this patent

UNITED STATES PATENTS

| | | |
|---|---|---|
| 1,537,479 | Lord | May 12, 1925 |
| 1,664,630 | Koehler | Apr. 3, 1928 |
| 2,373,913 | Pike | Apr. 17, 1945 |
| 2,400,360 | McMullen et al. | May 14, 1946 |